J. M. CHASTAIN.
Manure-Distributer.

No. 217,060.  Patented July 1, 1879.

WITNESSES:
Henry N. Miller
C. Sedgwick

INVENTOR:
J. M. Chastain
BY Munn & Co
ATTORNEYS.

UNITED STATES PATENT OFFICE.

JEPTHA M. CHASTAIN, OF GAYLESVILLE, ALABAMA.

IMPROVEMENT IN MANURE-DISTRIBUTERS.

Specification forming part of Letters Patent No. 217,060, dated July 1, 1879; application filed April 22, 1879.

*To all whom it may concern:*

Be it known that I, JEPTHA M. CHASTAIN, of Gaylesville, in the county of Cherokee and State of Alabama, have invented a new and Improved Manure-Distributer, of which the following is a specification.

The object of this invention is to provide a machine for distributing manure in rows at proper distances apart and in variable quantities.

It consists of devices and arrangements that will be fully described, in connection with the drawings forming part of this specification, and specifically pointed out in the claims.

Figure 1:
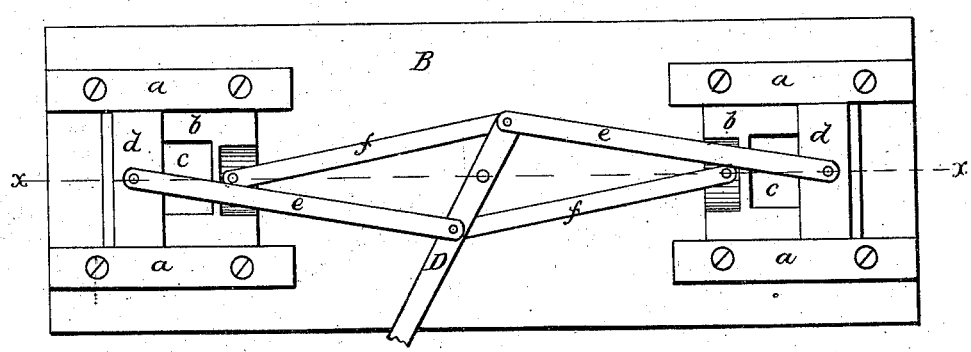
Figure 2:
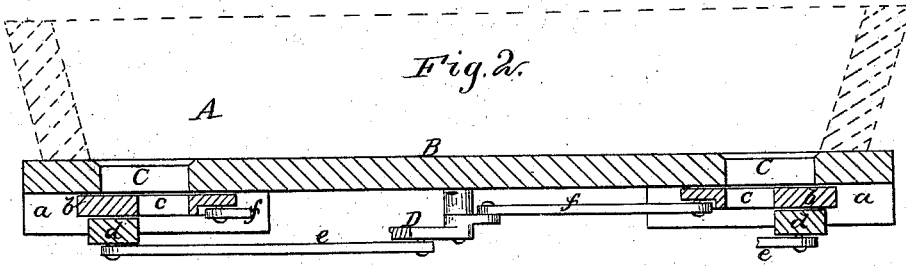

In the accompanying drawings, Figure 1 is a bottom view of the invention, and Fig. 2 is a longitudinal section of the same.

Similar letters of reference indicate corresponding parts.

Referring to the drawings, A represents the box or hopper in which the manure is placed for distribution, having a bottom, B, with openings C C at or near each end within the box. This bottom is placed under an axle boxed in the bottom between it and the box. The axle is adapted to revolve and carry one wheel, on which it is sustained, while the opposite wheel is placed loosely on the spindle of the axle, so as to turn freely, and thus facilitate turning corners, &c.

Under the bottom B, equally distant from the sides of each of the holes C, are bevel-edged cleats $a$ $a$, the beveled edges turned toward the holes and the bottom. In these cleats are placed, so as to move freely, slides $b$, with openings $c$, and next to these, supported in the same cleats, are slide-valves $d$.

In the middle of the bottom, underneath, is fulcrumed a lever, D. Connecting-rods $e$ $e$ join this lever with the slide-valves $d$, while rods $f f$ connect it with the slides $b$, as clearly shown in Fig. 1, so that by turning the lever in one direction on its fulcrum the slides and valves are drawn toward each other and the openings in the slides are covered; but when reversed they are moved in opposite directions and the openings uncovered, wholly or in part, as may be desired.

The manure is placed in the box A, and passes down through holes C C to the slides, through the openings therein, and if the valves $d$ are open it passes down to the ground and is deposited in rows.

When the distribution of the manure is to be stopped the valves are closed over the openings in the slides. By means of these valves, also, the size of the opening may be regulated, and thus the quantity of manure passing out in a given time accurately regulated.

Having thus described my invention, I claim as new and desire to secure by Letters Patent—

The combination, with the hopper A, provided with an opening, C, near each end, of the bevel-edged cleats $a$, slides $b$, with openings $c$, the slide-valves $d$, rods $e$ $f$, and the lever D, all arranged substantially as shown and described.

JEPTHA MARION CHASTAIN.

Witnesses:
A. B. RUSSELL,
MARCUS M. RUSSELL.